(12) United States Patent
Takahashi et al.

(10) Patent No.: US 11,249,502 B2
(45) Date of Patent: Feb. 15, 2022

(54) POWER CONTROL DEVICE AND CONTROL METHOD EMPLOYED THEREIN

(71) Applicants: IKS CO., LTD., Kyoto (JP); JGC CORPORATION, Yokohama (JP)

(72) Inventors: Shinji Takahashi, Kanagawa (JP); Go Iritani, Kanagawa (JP); Takashi Imai, Kyoto (JP)

(73) Assignees: IKS CO., LTD., Kyoto (JP); JGC CORPORATION, Yokohama (JP)

( * ) Notice: Subject to any disclaimer, the term of this patent is extended or adjusted under 35 U.S.C. 154(b) by 145 days.

(21) Appl. No.: 16/338,702

(22) PCT Filed: Oct. 3, 2016

(86) PCT No.: PCT/JP2016/079371
§ 371 (c)(1),
(2) Date: Apr. 2, 2019

(87) PCT Pub. No.: WO2018/066044
PCT Pub. Date: Apr. 12, 2018

(65) Prior Publication Data
US 2020/0301461 A1    Sep. 24, 2020

(51) Int. Cl.
*G05F 1/67*   (2006.01)
(52) U.S. Cl.
CPC ................................ *G05F 1/67* (2013.01)
(58) Field of Classification Search
CPC ........................................................ G05F 1/67
See application file for complete search history.

(56) References Cited

U.S. PATENT DOCUMENTS

2010/0282289 A1* 11/2010 Wu .................... H01L 31/02021
                                                                  136/244
2011/0140520 A1*  6/2011 Lee ................... H01L 31/02021
                                                                  307/25

(Continued)

FOREIGN PATENT DOCUMENTS

CN    102511117    6/2012
JP    S60256824    12/1985

(Continued)

OTHER PUBLICATIONS

"Written Opinion of the International Searching Authority (Form PCT/ISA/237) of PCT/JP2016/079371", with English translation thereof, dated Dec. 27, 2016, pp. 1-15.

(Continued)

*Primary Examiner* — Rexford N Barnie
*Assistant Examiner* — Brian K Baxter
(74) *Attorney, Agent, or Firm* — JCIP Global Inc.

(57) ABSTRACT

Provided are a power control device and control method employed therein. The power control device is provided with: a storage battery connected between the solar cell and the power conditioner; a converter, which is disposed between the storage battery and the solar cell, and which charges the storage battery with output power of the solar cell; and a control unit which controls the converter such that the converter charges the storage battery with differential power between the output power of the solar cell and the output power of the power conditioner in the cases where it is determined that the output of the solar cell will be larger than the outputtable power of the power conditioner.

18 Claims, 9 Drawing Sheets

(56) References Cited

U.S. PATENT DOCUMENTS

| | | | | |
|---|---|---|---|---|
| 2011/0148195 | A1* | 6/2011 | Lee | H02J 9/061 |
| | | | | 307/25 |
| 2011/0148360 | A1* | 6/2011 | Lee | H02J 9/062 |
| | | | | 320/134 |
| 2011/0175565 | A1* | 7/2011 | Lee | H02J 7/35 |
| | | | | 320/101 |
| 2011/0291606 | A1* | 12/2011 | Lee | H02J 3/32 |
| | | | | 320/101 |
| 2012/0062202 | A1* | 3/2012 | Min | G05F 1/67 |
| | | | | 323/299 |
| 2012/0153726 | A1* | 6/2012 | Moon | H02J 3/32 |
| | | | | 307/46 |
| 2012/0173031 | A1* | 7/2012 | Parameswaran | H02J 7/35 |
| | | | | 700/295 |
| 2013/0328397 | A1* | 12/2013 | Lee | H02J 3/381 |
| | | | | 307/23 |
| 2013/0328406 | A1* | 12/2013 | Matsuura | G05F 1/67 |
| | | | | 307/82 |
| 2015/0001932 | A1* | 1/2015 | Inoue | G05F 1/67 |
| | | | | 307/24 |
| 2015/0145328 | A1* | 5/2015 | Ohshima | H02J 3/381 |
| | | | | 307/22 |
| 2016/0233689 | A1* | 8/2016 | Shim | H02J 3/32 |

FOREIGN PATENT DOCUMENTS

| | | |
|---|---|---|
| JP | S63181015 | 7/1988 |
| JP | H06266458 | 9/1994 |
| JP | 2007-201257 | 8/2007 |
| JP | 2010-066916 | 3/2010 |
| JP | 2015-073433 | 4/2015 |
| JP | 2016158412 | 9/2016 |

OTHER PUBLICATIONS

"Office Action of Canada Counterpart Application", dated Jun. 9, 2020, pp. 1-4.

"Office Action of China Counterpart Application", dated Jul. 20, 2020, with English translation thereof, pp. 1-9.

"International Search Report (Form PCT/ISA/210)"of PCT/JP2016/079371, dated Dec. 27, 2016, with English translation thereof, pp. 1-4.

"Office Action of China Counterpart Application," dated Dec. 26, 2019, with English translation thereof, p. 1-p. 25.

"Office Action of Canada Counterpart Application", dated Jun. 22, 2021, p. 1-p. 4.

* cited by examiner

Generation power of solar cell 200

Output power of pcs 300

Generation power of solar cell 200

Charging power of battery 20

Discharging power of battery 20

POWER CONTROL DEVICE AND CONTROL METHOD EMPLOYED THEREIN

CROSS-REFERENCE TO RELATED APPLICATION

This application is a 371 of international application of PCT application serial no. PCT/JP2016/079371, filed on Oct. 3, 2016. The entirety of the abovementioned patent application is hereby incorporated by reference herein and made a part of this specification.

BACKGROUND

Technical Field

The present invention relates to a power control device and a control method employed therein.

Background Art

Solar power generation systems that generate electricity from solar light are known. Solar power generation systems include solar cells and further include power conditioners (PCS) that convert direct currents (DC) output from the solar cells into alternating currents (AC) of systems and integrate the plurality of solar cells for system interconnection.

A power conditioner has a function of controlling maximum power point tracking (MPPT) on power generated by solar cells (see Patent Literature 1).

In recent years, there is a request for suppressing an output for system stabilization in solar power generation. A device in which a storage battery is provided at a rear stage of a PCS in order not to decrease an amount of power generated in the solar power generation by suppressing an output has been disclosed (see Patent Literature 2).

In Patent Literature 3, a lithium ion battery is provided between a solar cell module and a DC/AC conversion device, but the DC/AC conversion device does not perform control at a maximum power amount by MPPT control.

By setting a charging or discharging voltage of a lithium ion battery to be in the vicinity of a maximum power point of the solar cell module, the lithium ion battery is charged in solar power generation.

CITATION LIST

Patent Literature

Patent Literature 1: Japanese Unexamined Patent Application Publication No. 2010-066916
Patent Literature 2: Japanese Unexamined Patent Application Publication No. 2015-073433
Patent Literature 3: Japanese Unexamined Patent Application Publication No. 2007-201257

SUMMARY

Technical Problem

Patent Literature 1 discloses technical description of MPPT of a PCS, but does not disclose battery control.

Patent Literature 2 discloses a technology for providing a storage type water heater and a storage battery at a rear stage of a PCS.

Patent Literature 3 provides a configuration in which a storage battery is provide at a front stage of a PCS. However, a battery configuration for solar power generation is provided at a maximum power point and there is no requirement for charging amount control of the battery.

As described above, a power generation device in which a battery is disposed at a front stage of a PCS to maintain maximum power of solar power generation has not yet been disclosed.

Solution to Problem

Modes for solving the foregoing problems will be described according to the following aspects.

Aspect 1

A power control device controls power generated by a solar power generation device. The solar power generation device includes a solar cell and a power conditioner that performs maximum power point tracking (MPPT) control on the solar cell and converts a direct current (DC) generated by the solar cell into an alternating current (AC). The power control device includes a storage battery connected between the solar cell and the power conditioner, a converter that is disposed between the storage battery and the solar cell and charges the storage battery with output power of the solar cell, and a control unit that controls the converter such that the converter charges the storage battery with differential power between the output power of the solar cell and the output power of the power conditioner when the control unit determines an output of the solar cell is greater than outputtable power of the power conditioner.

The power conditioner performs the MPPT control on the basis of self-predetermined power (for example, rated power). Therefore, since power equal to or greater than the predetermined power may not be discharged, uncollected power occurs. The control unit performs control such that the uncollected power is collected in the storage battery on the basis of power which can inherently be output from the solar cell.

Aspect 2

In the power control device according to Aspect 1, when an output suppression signal for suppressing an output of the power conditioner is received, the control unit may set a suppression output indicated in the output suppression signal by the outputtable power of the power conditioner.

When output suppression occurs, the uncollected power can be collected to a battery.

Aspect 3

The power control device according to Aspect 1 or 2 may further include a power meter that measures power of the power conditioner. The control unit may determine that an output of the solar cell is greater than the outputtable power of the power conditioner when the power measured by the power meter reaches the outputtable power of the power conditioner.

Aspect 4

In the device according to any one of Aspects 1 to 3, the control unit may control the charging of the storage battery using the converter not to deviate from a maximum power point (MPP) in the MPPT control.

This is because an amount of power generated in the solar cell can be prevented from decreasing at the time of the deviation from the MPP in the MPPT control of the power conditioner.

Aspect 5

In the device according to any one of Aspects 1 to 4, the control unit may control the charging of the storage battery using the converter with a time constant longer than a time constant of the MPP of the power conditioner.

The control of the storage battery does not affect control of the MPPT by causing the time constant to be longer than that of the MPPT of the power conditioner.

Aspect 6

In the device according to any one of Aspects 1 to 5, a speed of the charging may be slowed when the output power of the power conditioner is determined to be less than the outputtable power.

Aspect 7

The device according to any one of Aspects 1 to 6 may further include an illumination meter. The control unit may retain current/voltage feature data of the solar cell in accordance with an incident amount obtained from the illumination meter. The control unit may calculate power of the solar cell corresponding to incidence data obtained from the illumination meter with reference to the current/voltage feature data. The control unit may subtract the outputtable power of the power conditioner from the calculated power to calculate charging power when the calculated power is greater than the outputtable power of the power conditioner. The control unit may control the converter such that the storage battery is charged with the charging power.

Aspect 8

In the device according to any one of Aspects 1 to 7, the control unit may calculate a maximum power point (MPP) of the solar cell corresponding to the incidence data obtained from the illumination meter. The control unit may calculate a charging power obtained by subtracting the outputtable power of the power conditioner from power of the solar cell at the MPP. The control unit may control the converter such that a bus line connecting the solar cell to the power conditioner is maintained at a voltage at the MPP and the storage battery is charged with the calculated charging power.

Aspect 9

In the power control device according to any one of Aspects 1 to 8, when the control unit determines that the power is less than the outputtable power of the power conditioner, the control unit may control the converter such that power is discharged from the storage battery.

Aspect 10

In the power control device according to any one of Aspects 1 to 9, the control unit may calculate the MPP of the solar cell corresponding to the incidence data obtained from the illumination meter with reference to the current/voltage feature data. When the control unit determines that the power measured by the power meter is less than the calculated power, the control unit may control the converter such that the bus line connecting the solar cell to the power conditioner maintains a voltage at the calculated MPP of the solar cell and power is discharged from the storage battery.

Aspect 11

There is provided a control method of a power control device that controls power generated by a solar power generation device. The solar power generation device includes a solar cell and a power conditioner that performs maximum power point tracking (MPPT) control on the solar cell and converts a direct current generated by the solar cell into an alternating current. The power control device includes a storage battery connected between the solar cell and the power conditioner, a converter that is disposed between the storage battery and the solar cell and charges the storage battery with output power of the solar cell, and a control unit. The control unit controls the converter such that the converter charges the storage battery with differential power between the output power of the solar cell and the output power of the power conditioner when the control unit determines an output of the solar cell is greater than outputtable power of the power conditioner.

Aspect 12

In the control method according to Aspect 11, when an output suppression signal for suppressing an output of the power conditioner is received, the control unit may set a suppression output indicated in the output suppression signal by the outputtable power of the power conditioner.

Aspect 13

In the control method according to Aspect 11 or 12, the power control device may further include a power meter that measures power of the power conditioner. The control unit may determine that an output of the solar cell is greater than the outputtable power of the power conditioner when the power measured by the power meter reaches the outputtable power of the power conditioner.

Aspect 14

In the control method according to any one of Aspect 11 to 13, the control unit may control the charging of the storage battery using the converter not to deviate from a maximum power point (MPP) in the MPPT control.

Aspect 15

In the control method according to any one of Aspect 11 to 14, the control unit may control the charging of the storage battery using the converter with a time constant longer than a time constant of the MPP of the power conditioner.

Aspect 16

In the control method according to any one of Aspect 11 to 15, a speed of the charging may be slowed when the output power of the power conditioner is determined to be less than the outputtable power.

Aspect 17

In the control method according to any one of Aspect 11 to 16, the power control device may further include an illumination meter. The control unit may retain current/voltage feature data of the solar cell in accordance with an incident amount obtained from the illumination meter. The control unit may calculate power of the solar cell corresponding to incidence data obtained from the illumination meter with reference to the current/voltage feature data. The control unit may subtract the outputtable power of the power conditioner from the calculated power to calculate charging power when the calculated power is greater than the outputtable power of the power conditioner. The control unit may control the converter such that the storage battery is charged with the charging power.

Aspect 18

In the control method according to any one of Aspect 11 to 17, the control unit may calculate a maximum power point (MPP) of the solar cell corresponding to the incidence data obtained from the illumination meter. The control unit may calculate a charging power obtained by subtracting the outputtable power of the power conditioner from power of the solar cell at the MPP. The control unit may control the converter such that a bus line connecting the solar cell to the power conditioner is maintained at a voltage at the MPP and the storage battery is charged with the calculated charging power.

Aspect 19

In the control method according to any one of Aspect 11 to 18, when the control unit determines that the power is less than the outputtable power of the power conditioner, the control unit may control the converter such that power is discharged from the storage battery.

Aspect 20

In the control method according to any one of Aspect 11 to 19, the control unit may calculate the MPP of the solar cell corresponding to the incidence data obtained from the illumination meter with reference to the current/voltage feature data. When the control unit determines that the power measured by the power meter is less than the calculated power, the control unit may control the converter such that the bus line connecting the solar cell to the power conditioner maintains a voltage at the calculated MPP of the solar cell and power is discharged from the storage battery.

Advantageous Effects of Invention

The power control device according to the present embodiment can collect power which can inherently be generated from the solar cell and raise an amount of power generated in the solar power generation.

DESCRIPTION OF THE EMBODIMENTS

Hereinafter, the present embodiment will be described in the order of 1. Power control device and 2. Power control process.

1. Power Control Device

Figure 1:
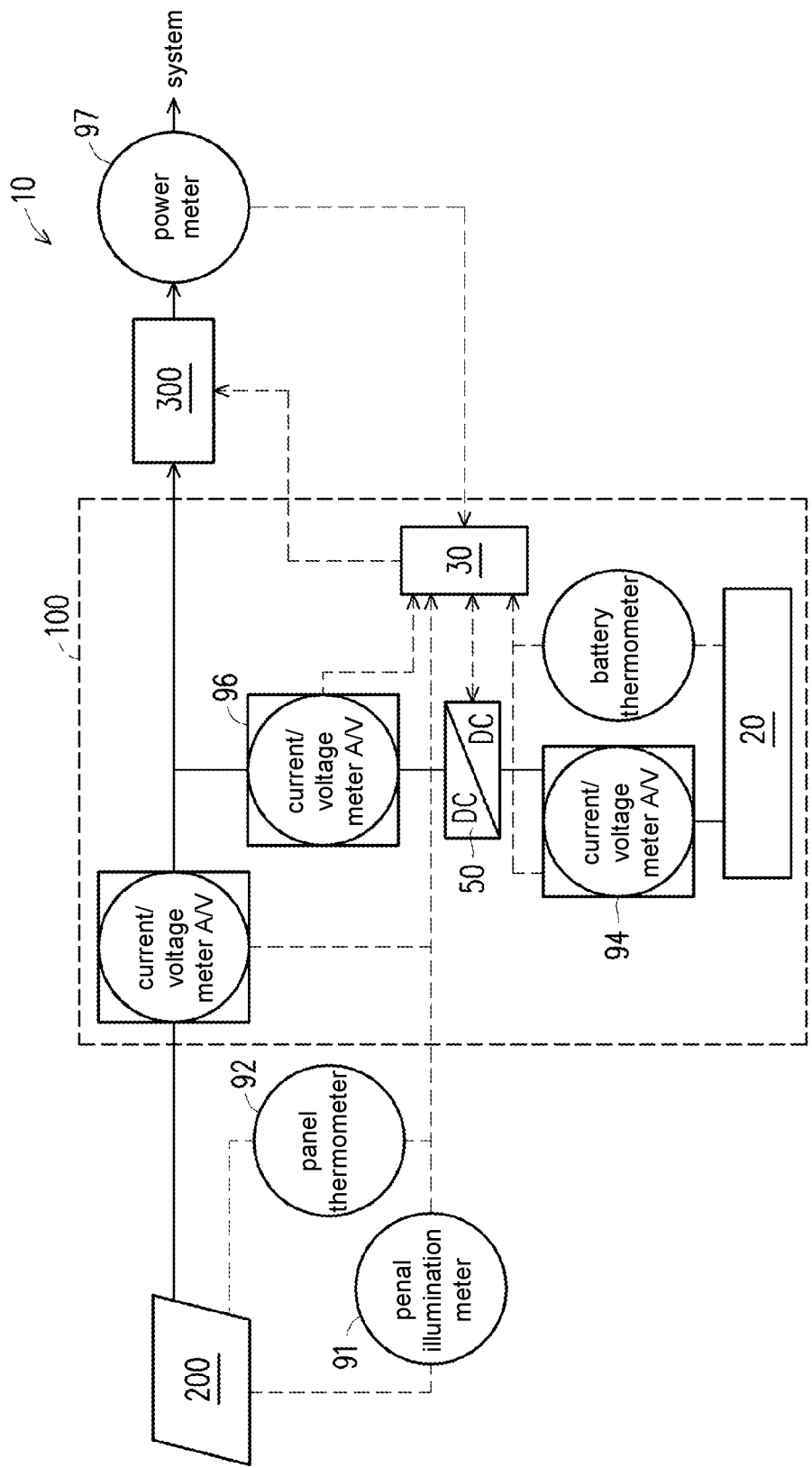
FIG. 1 is a diagram illustrating an example of a power control device.

FIG. 1 is a diagram illustrating an example of a power control device.

A power control device 100 is connected to a solar power generation device 10 and controls power generated by the solar power generation device 10. The solar power generation device 10 includes a solar cell (PV: photovoltaic) 200 including a plurality of solar cells and a power conditioner (PCS) 300. The solar cell 200 may be a solar cell array formed by many solar cells. The PCS 300 performs maximum power point tracking (MPPT) control on the solar cell 200 and converts direct-current (DC) power generated by the solar cell into alternating-current (AC) power. A rated output of the solar cell is greater than a rated output of the power conditioner.

The solar power generation device 100 includes a storage battery 20, a control unit 30, and a DC/DC (direct-current/direct-current converter) 50. The storage battery 20 is connected between the solar cell 200 and the PCS 300 via the DC/DC 50. Further, the DC/DC 50 is disposed on a DC bus line between the storage battery 20 and the solar cell 200, charges the storage battery 20 with output power of the solar cell 200, and also performs discharging from the storage battery 20. The DC/DC 50 is provided to fit a voltage condition of the bus line and voltage and current conditions (battery output) of the storage battery 20.

The power control device 100 further includes current/voltage meters 94 and 96 that measure charging and discharging amounts to and from the storage battery 20. The current/voltage meter 96 is used to operate the DC/DC 50 so that a voltage of the solar cell 200 is maintained at a predetermined voltage of the MPPT. The current/voltage meter 94 is used to control the DC/DC 50 so that a charging and discharging voltage of the storage battery 20 is set to a predetermined value.

A current meter that measures AC power of the power meter 97 is provided at the rear stage of the PCS 300.

The power control device 100 further includes a panel illumination meter 91 and a panel thermometer 92. These meters can be used to ascertain illumination and temperature toward the solar cell.

When the control unit 30 determines that an output of the solar cell 200 is greater than outputtable power of the PCS 300, the control unit 30 controls the DC/DC 50 such that the DC/DC 50 charges the storage battery 20 with differential power between the output power of the solar cell 200 and the output power of the PCS 300.

The PCS 300 performs MPPT control on the basis of the outputtable power (for example, rated power or suppression power to be described below). Therefore, since power equal to or greater than predetermined power may not be discharged, uncollected power occurs. On the basis of power which can inherently be output from the solar cell 200, the control unit 30 performs control such that the uncollected power is collected in the storage battery 20.

The PCS 300 sets power to output suppression power when the PCS 300 receives an output suppression signal for suppressing an output of solar power generation from a system service provider.

A solar cell has a property in which an extractable current is determined by a voltage of a connected load. Since power is voltage current, a point at which VI is the maximum is a maximum output point. The PCS 300 reaches a maximum power point in accordance with a method of further increasing a current at the time of an increase in power passing through the PCS 300 when an output current of the solar cell 200 is gradually increased under current control from the start of a desired operation point, and conversely decreasing the current at the time of a decrease in the power.

The control unit 30 further uses the illumination meter 91 to maintain current/voltage feature data in accordance with an incidence amount of the solar cell 200. Then, the control unit 30 calculates a voltage, a current, and power corresponding to incidence data obtained from the illumination meter with reference to the current/voltage feature data. In this way, when the calculated power is greater than the outputtable power of the PCS 300, the outputtable power of the PCS 300 is subtracted from the calculated power to calculate charging power. The control unit 30 controls the DC/DC 50 such that the storage battery 20 is charged with the charging power.

In the foregoing process, the control unit calculates a maximum power point (MPP) of the solar cell 200 corresponding to the incidence data obtained from the illumination meter with reference to the current/voltage feature data and calculates the charging power by subtracting the outputtable power of the PCS 300 from power at the MPP of the solar cell 200. Then, the DC/DC 50 is controlled to charge the storage battery 20 with the calculated charging power under the voltage at the MPP.

When the output suppression is received from the system service provider or the like, the solar power generation device 10 suppress at least a part of an amount of generated power and is controlled such that a demand and supply balance of the power in the system is maintained in order to keep a power infrastructure. The control unit 30 monitors the output of the PCS 300 using the power meter 97.

A voltage and a current flowing in the power bus line to the power conditioner from the solar power generation are decided by setting the output suppression. Accordingly, when the solar power generation device 10 generates power beyond a suppression output, a potential output of the solar power generation may not be detected despite detection of a voltage and a current of the bus line. Therefore, the control unit 30 performs control such that the storage battery 20 is charged with a given amount of power from the DC/DC 50, a total sum of the charging power and a numerical value of the power meter 97 is calculated, an MPPT function of the PCS 300 operates normally, and the maximum power is output. There is also a method of using the illumination meter to calculate the potential output of the solar power generation device from the illumination meter.

2. Power Control Process

2.1. Charging Process in Storage Battery at Time of Overcharging

Figure 2:
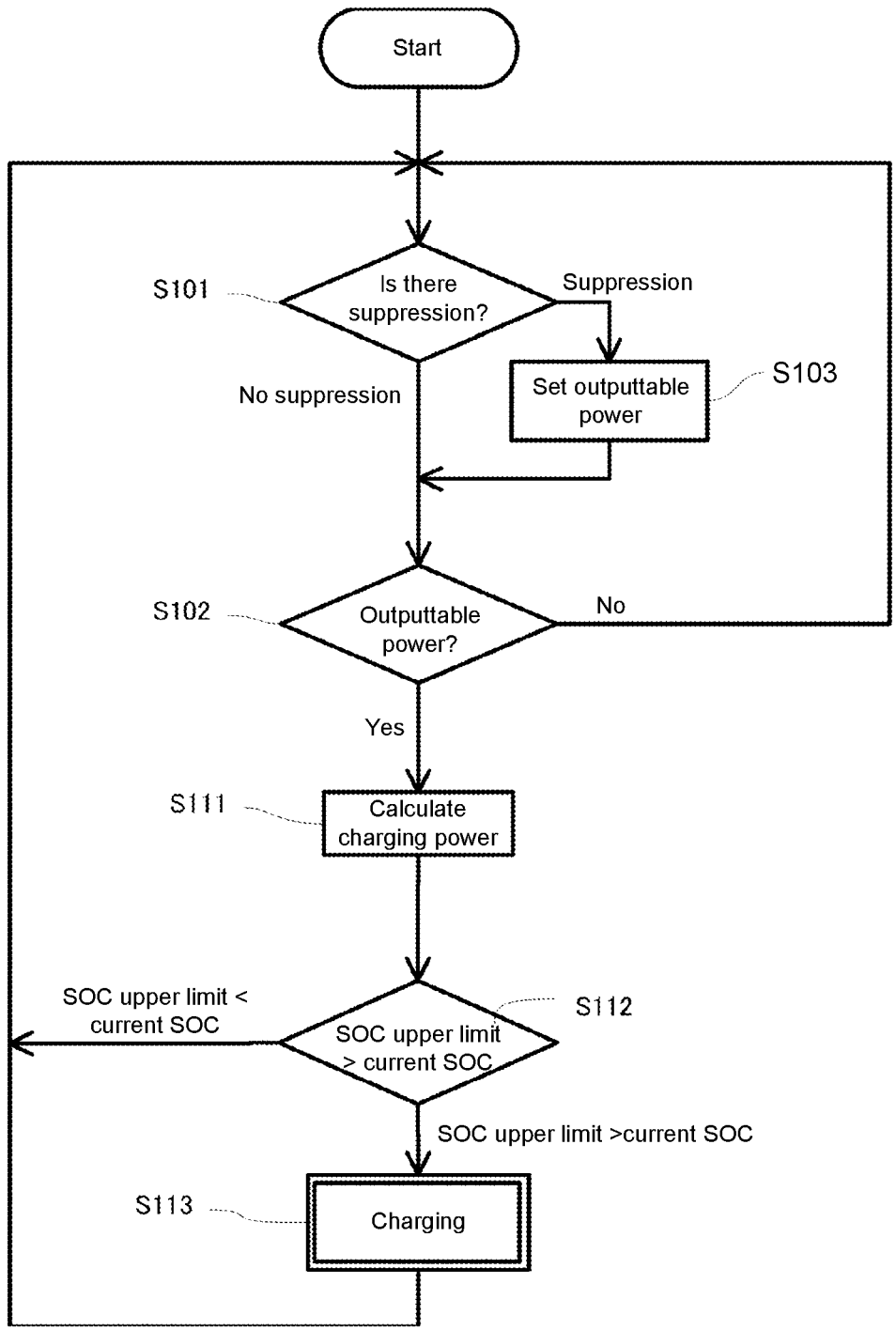
FIG. 2 is a flowchart illustrating a charging process in a storage battery at the time of overcharging.

FIG. 2 is a flowchart illustrating a charging process in a storage battery at the time of overcharging. The overcharging indicates a state in which an output of the solar cell 200 is greater than an output from the PCS 300. The overcharging also includes a case in which a solar cell output is greater than power suppressed from a PCS rated value by the output suppression. The control unit 30 calculates a total sum of the output power of the PCS 300 and the charging power to the storage battery 20 and adjusts the charging power while the power meter 97 maintains the maximum power so that the output power of the solar cell 200 is a peak.

When a process starts, the control unit 30 determines whether there is an output suppression signal (S101). When there is the output suppression (Suppression in S101), the outputtable power of the PCS is set to the suppression power (S103).

The control unit 30 determines whether the power reaches the outputtable power of the PCS 300 with reference to the power meter 97 (S102). The outputtable power is a rated output of the PCS 300 when there is no output suppression. The outputtable power is a suppressed output when there is the output suppression. When the power does not reach the outputtable power (No in S102), the process returns to S101 without performing the charging control. When the power reaches the outputtable power (Yes in S102), the process proceeds to step S111.

In the determination of the outputtable power (S102), the control unit 30 may calculate the maximum power point (MPP) of the solar cell 200 corresponding to the temperature and the illumination obtained from the illumination meter 91 and the thermometer 92 with reference to the current/voltage feature data and whether the calculated MPP exceeds the outputtable power may be determined.

Figure 3A:
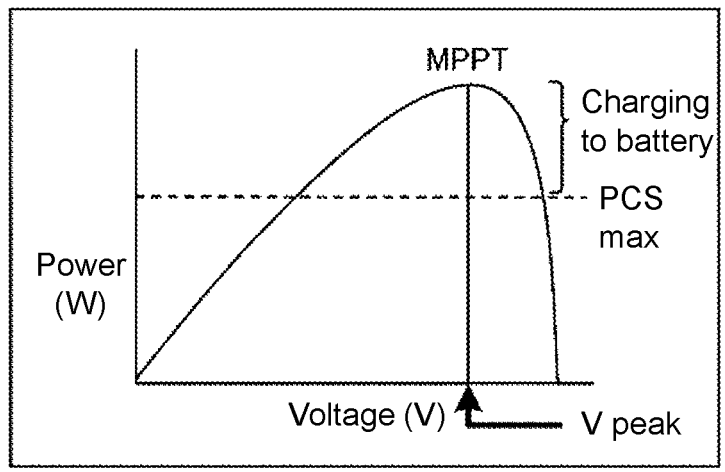
FIG. 3A is a diagram illustrating generation power of a PV in a case illustrated in FIG. 2.
Figure 3B:
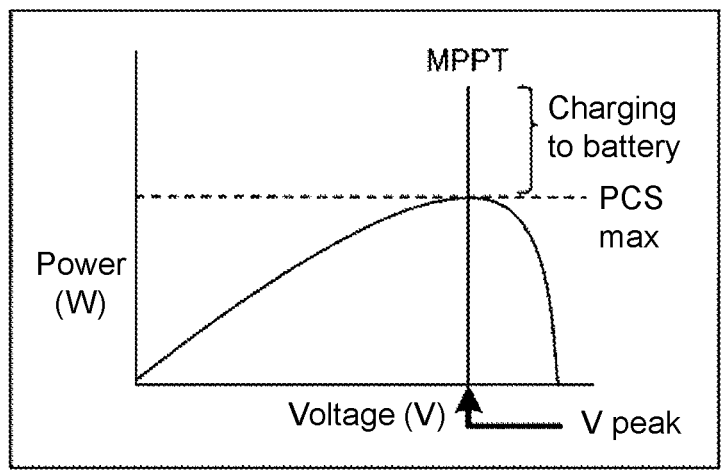
FIG. 3B is a diagram illustrating output power of a PCS in the case illustrated in FIG. 2.

In S111, the charging power (kw) is calculated. When the charging power is greater than a power change performed by MPPT control of the PCS 300, the PCS 300 may not maintain the MPP. Therefore, the charging power is set to an appropriate amount which does not deviate from the MPP while monitoring whether the outputtable power of the MPP is maintained with reference to the power meter 97. FIG. 3A is a diagram illustrating generation power of a PV. The MPP exceeding the maximum value of the PCS is calculated. The control unit 30 maintains a PCS entrance voltage and a bus line side voltage of the DC/DC 50 to a voltage (V peak) at the MPP. FIG. 3B is a diagram illustrating output power of a PCS. The PCS side performs control such that discharging is performed at the MPPT at the V peak.

For example, a rate at which the storage battery is charged with 5% of the output of the PCS 300 for about 10 seconds is set. In the case of the PCS with a rated 50 kw, a rate of about 15 kw which is 30% of the rated 50 kw is set. When a time constant of the charging power calculation is advanced from a time constant of the MPPT control, the PCS may not maintain the MPP. Therefore, the time constant of the charging power calculation is made to be longer than the time constant of the MPPT control.

The charging power may be calculated using the MPP calculated in S102. At this time, the charging power is expressed as the following expression:

(charging power)=(calculated MPP of PV)−(outputtable power of PCS).

Figure 3C:
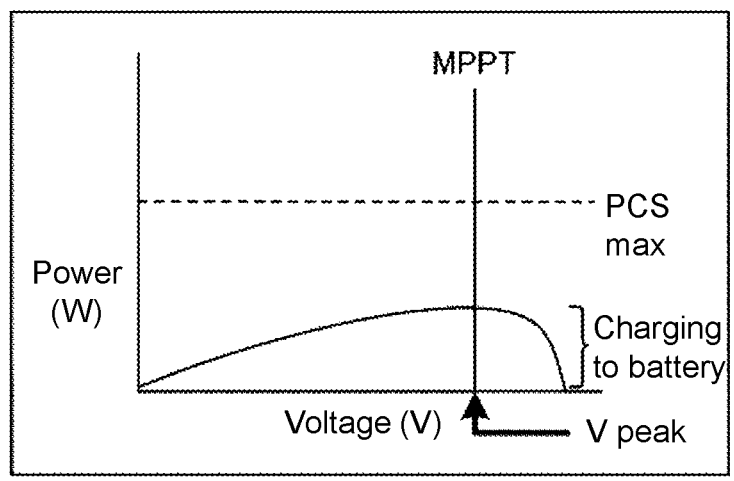
FIG. 3C is a diagram illustrating charging power in the storage battery in the case illustrated in FIG. 2.

The control unit 30 charges the storage battery 20 with the charging power calculated in S111 (S113) as long as a state of charge (SOC) of the battery does not reach an upper limit (SOC upper limit>current SOC in S112). FIG. 3C is a diagram illustrating charging power in the storage battery. The charging power is supplied to the storage battery so that the MPP of the PV is maintained.

Figure 4:
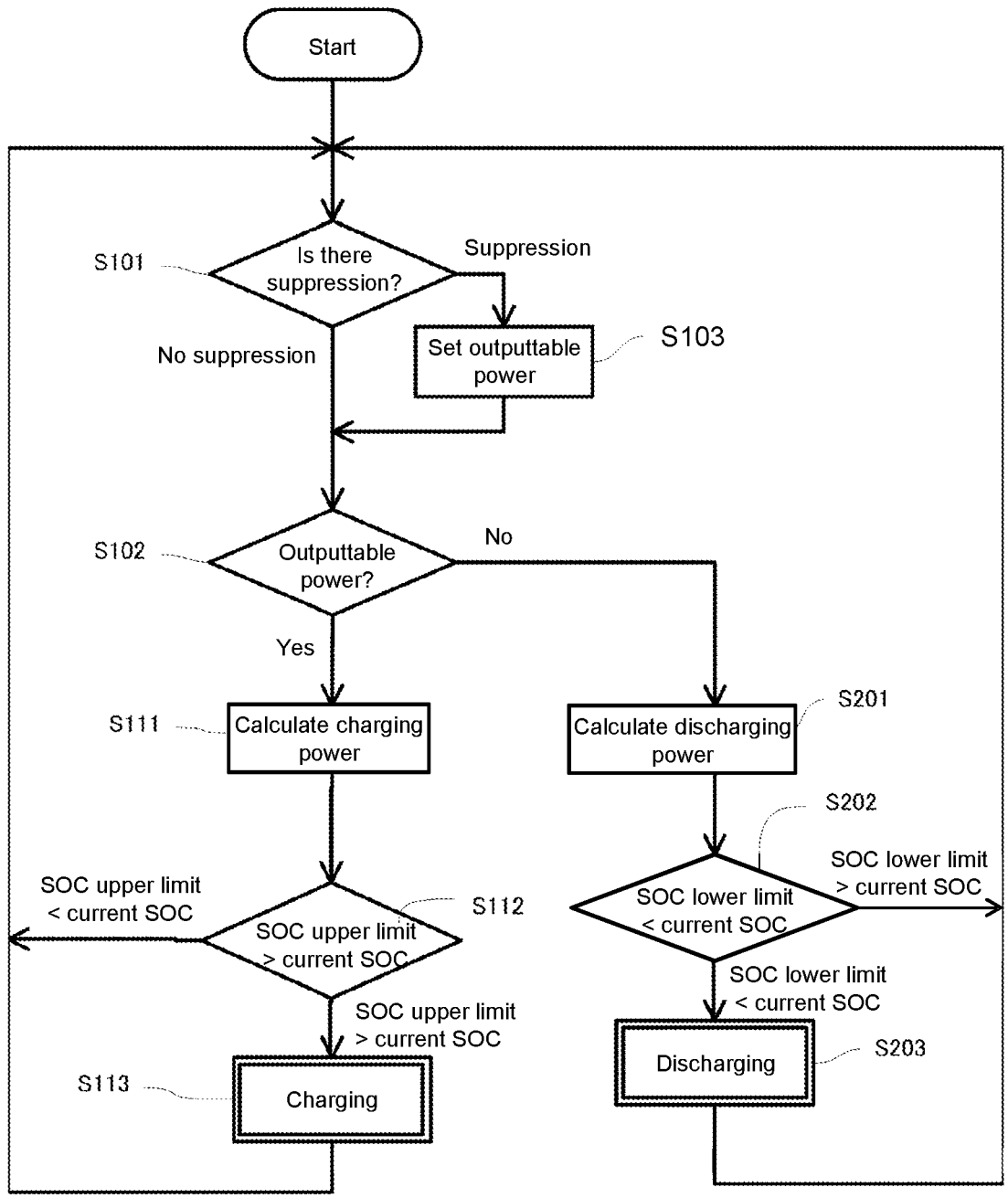
FIG. 4 is a flowchart illustrating a storage battery discharging process in a case in which a solar cell output is less than a PCS rated value.

2.2 Discharging Process in Case in Which Solar Cell Output is Less Than PCS Outputtable Power FIG. 4 is a flowchart illustrating a storage battery discharging process in a case in which a solar cell output is less than a PCS outputtable power.

Since S101 to S113 have been described with reference to FIG. 2, the description thereof will be omitted.

When discharging is performed and the PCS 300 does not reach the outputtable power (No in S102), the discharging is performed from the storage battery. In consideration of an improvement in an operation rate of the storage battery, the SOC is preferably set to be as low as possible in the storage battery so that the charging is possible at any time. Therefore, in S201, to set a discharging amount to be as maximum as possible, power obtained by subtracting the calculated power of the MPP of the solar cell 200 from the outputtable power of the PCS is discharged from the storage battery. At this time, the discharging power is expressed as the following expression:

(discharging power)=(outputtable power of PCS)−(calculated MPP of PV).

Figure 5A:
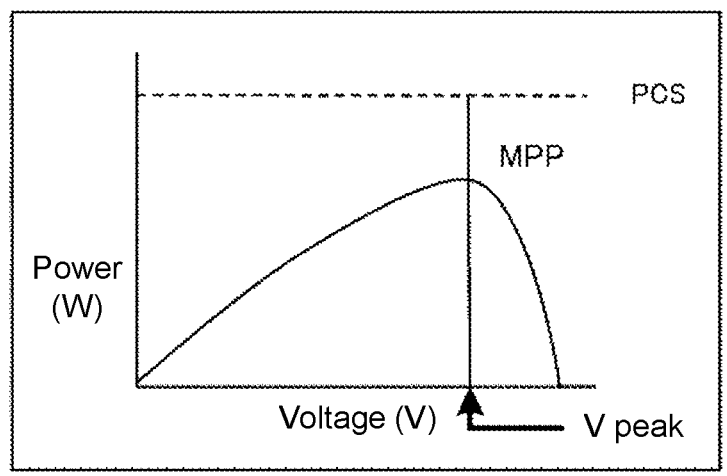
FIG. 5A is a diagram illustrating generation power of the PV in a case illustrated in FIG. 4.
Figure 5B:
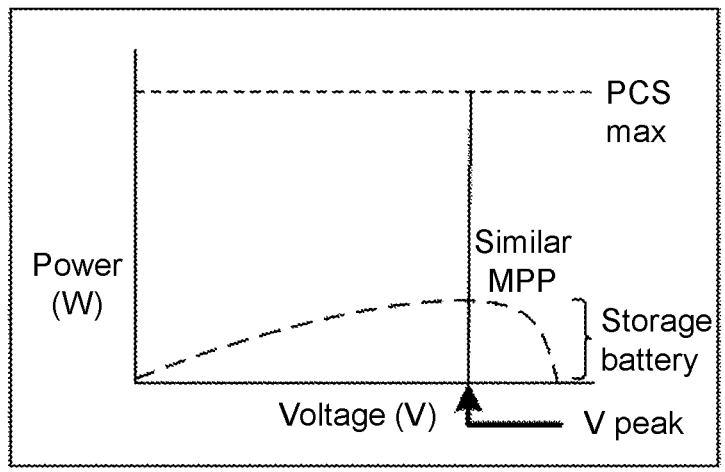
FIG. 5B is a diagram illustrating output power of the PCS in the case illustrated in FIG. 4.
Figure 5C:
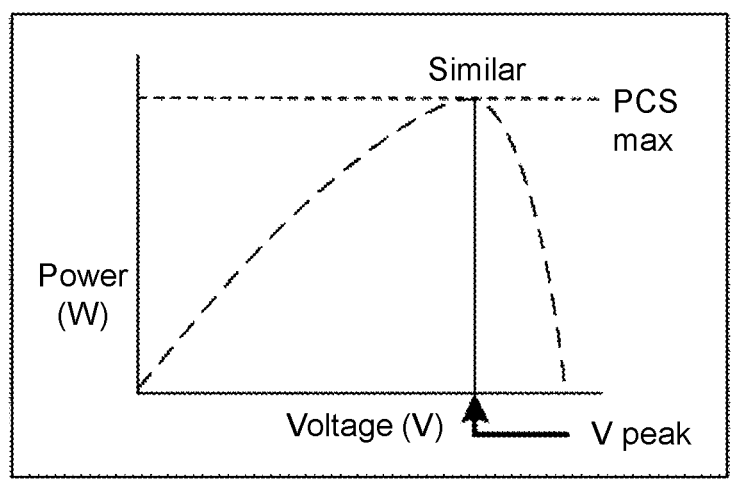
FIG. 5C is a diagram illustrating charging power in the storage battery in the case illustrated in FIG. 4.

FIG. 5B is an explanatory diagram illustrating discharging of the storage battery. FIG. 5C is an explanatory diagram illustrating outputtable power of the PCS. As illustrated in FIGS. 5B and 5C, to maintain the MPP of the solar cell 200, a discharging voltage and an input voltage of the PCS are the voltage (V peak) of the MPP.

The control unit 30 discharges the storage battery 20 with the discharging power calculated in S201 (S203) as long as a SOC of the battery exceeds a lower limit (SOC lower limit<current SOC in S202). In S203, a discharging amount illustrated in FIG. 5B is discharged.

2.3. Discharging Process in Case in Which There is No Solar Cell Output

Figure 6:
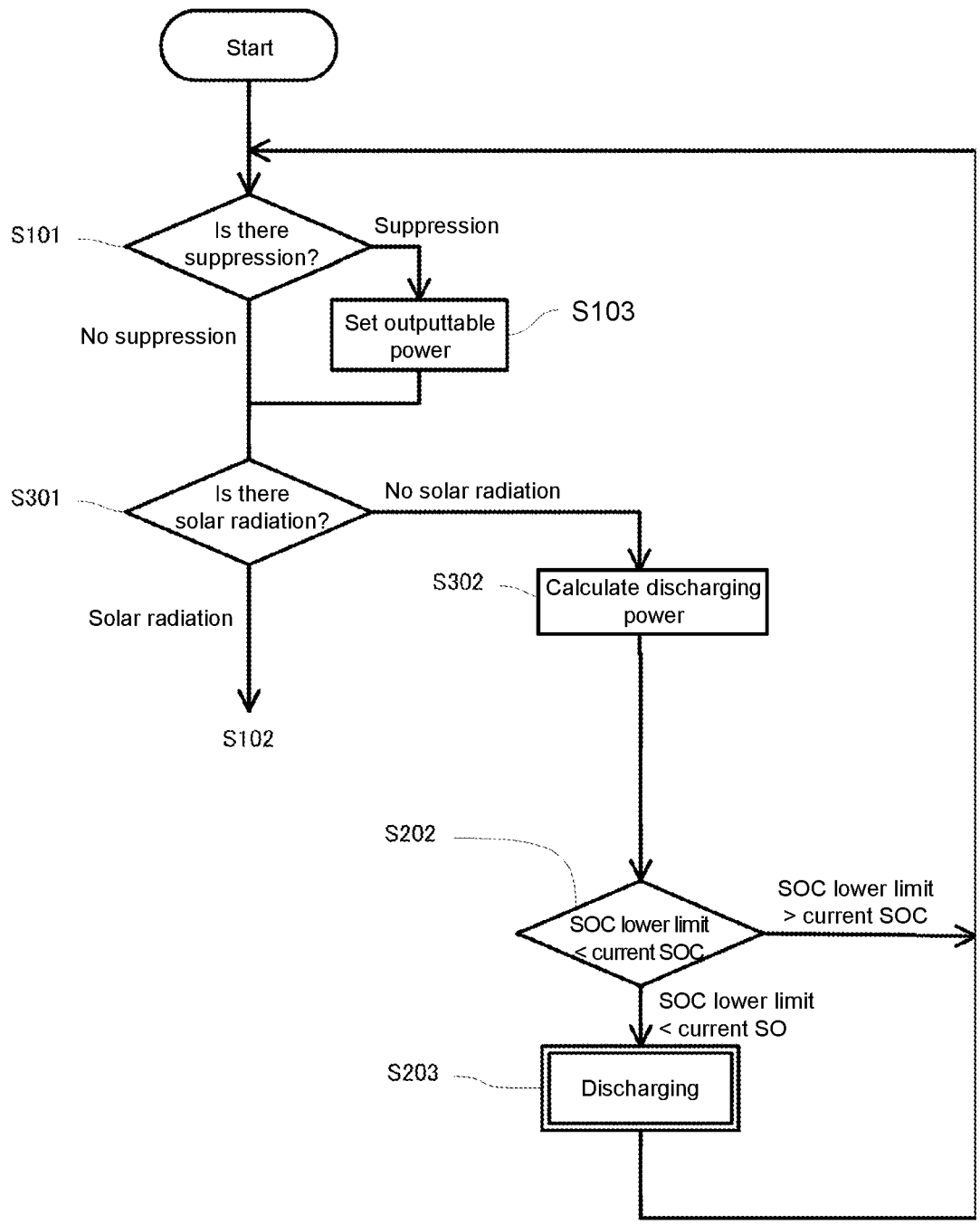
FIG. 6 is a flowchart illustrating a storage battery discharging process in a case in which there is no solar cell output.

FIG. 6 is a flowchart illustrating a storage battery discharging process in a case in which there is no solar cell output.

When there is no PV power generation such as clouding, rain, or night, an output from the PCS 300 is performed by setting an output power from the storage battery to the same voltage and current as those of the PV power generation.

Figure 7:
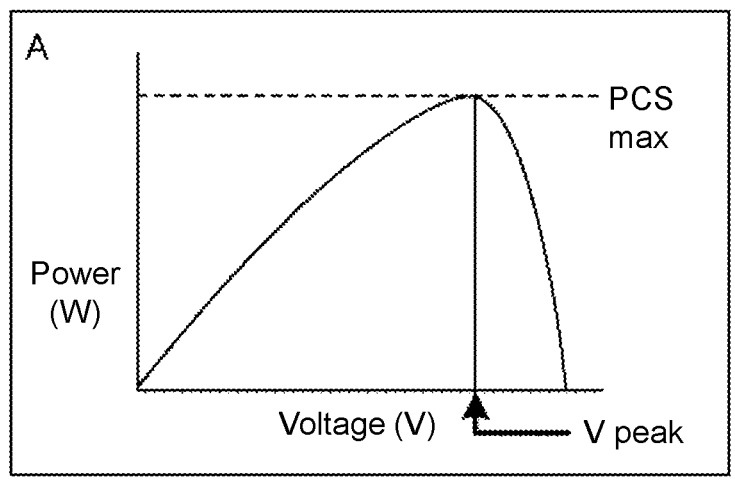
FIG. 7 is a diagram illustrating discharging power of the storage battery in a case illustrated in FIG. 6.

The control unit 30 determines whether the solar cell 200 is in a power generation state using an amount of solar radiation obtained from the illumination meter 91 (S301). When it is determined that there is no solar radiation, the output power from the storage battery 20 is calculated to the same voltage and current as those of the PV power generation (S302) and discharging is performed (S203). FIG. 7 is a diagram illustrating an example of a discharging amount from the storage battery 20. With regard to the discharging power, the storage battery 20 is preferably in a state in which the SOC is as low as possible and charging is possible at any time in consideration of an improvement in an operation rate of the storage battery. Therefore, the discharging power is preferably set to the rated power of the PCS 300.

What is claimed is:

1. A power control device that controls power generated by a solar power generation device,
   wherein the solar power generation device includes:
      a solar cell, and
      a power conditioner that performs maximum power point tracking control on the solar cell and converts a direct current generated by the solar cell into an alternating current, and
   wherein the power control device includes
      a storage battery connected between the solar cell and the power conditioner,
      a converter that is disposed between the storage battery and the solar cell and charges the storage battery with output power of the solar cell, and
      a control unit that controls the converter such that the converter charges the storage battery with differential power between the output power of the solar cell and the output power of the power conditioner when the control unit determines an output of the solar cell is greater than outputtable power of the power conditioner,
   wherein the control unit controls the charging of the storage battery using the converter with a time constant larger than a time constant of the maximum power point tracking control of the power conditioner.

2. The power control device according to claim 1, wherein when an output suppression signal for suppressing an output of the power conditioner is received, the control unit sets a suppression output indicated in the output suppression signal by the outputtable power of the power conditioner.

3. The power control device according to claim 1, further comprising:
   a power meter that measures power of the power conditioner,
   wherein the control unit determines that an output of the solar cell is greater than the outputtable power of the power conditioner when the power measured by the power meter reaches the outputtable power of the power conditioner.

4. The power control device according to claim 3, further comprising:
   an illumination meter,
   wherein the control unit retains current/voltage feature data of the solar cell in accordance with an incident amount obtained from the illumination meter,
   wherein the control unit calculates power of the solar cell corresponding to incidence data obtained from the illumination meter with reference to the current/voltage feature data,
   wherein the control unit subtracts the outputtable power of the power conditioner from the calculated power to calculate charging power when the calculated power is greater than the outputtable power of the power conditioner, and
   wherein the control unit controls the converter such that the storage battery is charged with the charging power.

5. The power control device according to claim 4,
   wherein the control unit calculates a maximum power point of the solar cell corresponding to the incidence data obtained from the illumination meter,
   wherein the control unit calculates a charging power obtained by subtracting the outputtable power of the power conditioner from power of the solar cell at the maximum power point, and
   wherein the control unit controls the converter such that a bus line connecting the solar cell to the power conditioner is maintained at a voltage at the maximum power point and the storage battery is charged with the calculated charging power.

6. The power control device according to claim 4,
wherein the control unit calculates a maximum power point of the solar cell corresponding to the incidence data obtained from the illumination meter with reference to the current/voltage feature data, and
wherein when the control unit determines that the power measured by the power meter is less than the calculated power, the control unit controls the converter such that a bus line connecting the solar cell to the power conditioner maintains a voltage at the calculated maximum power point of the solar cell and power is discharged from the storage battery.

7. The power control device according to claim 1, wherein the control unit controls the charging of the storage battery using the converter not to deviate from a maximum power point in the maximum power point tracking control.

8. The power control device according to claim 1, wherein a speed of the charging is slowed when the output power of the power conditioner is determined to be less than the outputtable power.

9. The power control device according to claim 1, wherein when the control unit determines that the power of the solar cell is less than the outputtable power of the power conditioner, the control unit controls the converter such that power is discharged from the storage battery.

10. A control method of a power control device that controls power generated by a solar power generation device,
wherein the solar power generation device includes
a solar cell, and
a power conditioner that performs maximum power point tracking control on the solar cell and converts a direct current generated by the solar cell into an alternating current,
wherein the power control device includes
a storage battery connected between the solar cell and the power conditioner,
a converter that is disposed between the storage battery and the solar cell and charges the storage battery with output power of the solar cell, and
a control unit, and
wherein the control unit controls the converter such that the converter charges the storage battery with differential power between the output power of the solar cell and the output power of the power conditioner when the control unit determines an output of the solar cell is greater than outputtable power of the power conditioner, wherein the control unit controls the charging of the storage battery using the converter with a time constant larger than a time constant of the maximum power point tracking control of the power conditioner.

11. The control method according to claim 10, wherein when an output suppression signal for suppressing an output of the power conditioner is received, the control unit sets a suppression output indicated in the output suppression signal by the outputtable power of the power conditioner.

12. The control method according to claim 10,
wherein the power control device further includes a power meter that measures power of the power conditioner, and
wherein the control unit determines that an output of the solar cell is greater than the outputtable power of the power conditioner when the power measured by the power meter reaches the outputtable power of the power conditioner.

13. The control method according to claim 12,
wherein the power control device further includes an illumination meter,
wherein the control unit retains current/voltage feature data of the solar cell in accordance with an incident amount obtained from the illumination meter,
wherein the control unit calculates power of the solar cell corresponding to incidence data obtained from the illumination meter with reference to the current/voltage feature data,
wherein the control unit subtracts the outputtable power of the power conditioner from the calculated power to calculate charging power when the calculated power is greater than the outputtable power of the power conditioner, and
wherein the control unit controls the converter such that the storage battery is charged with the charging power.

14. The control method according to claim 13,
wherein the control unit calculates a maximum power point of the solar cell corresponding to the incidence data obtained from the illumination meter,
wherein the control unit calculates a charging power obtained by subtracting the outputtable power of the power conditioner from power of the solar cell at the maximum power point, and
wherein the control unit controls the converter such that a bus line connecting the solar cell to the power conditioner is maintained at a voltage at the maximum power point and the storage battery is charged with the calculated charging power.

15. The control method according to claim 13,
wherein the control unit calculates a maximum power point of the solar cell corresponding to the incidence data obtained from the illumination meter with reference to the current/voltage feature data, and
wherein when the control unit determines that the power measured by the power meter is less than the calculated power, the control unit controls the converter such that a bus line connecting the solar cell to the power conditioner maintains a voltage at the calculated maximum power point of the solar cell and power is discharged from the storage battery.

16. The control method according to claim 10, wherein the control unit controls the charging of the storage battery using the converter not to deviate from a maximum power point in the maximum power point tracking control.

17. The control method according to claim 10, wherein a speed of the charging is slowed when the output power of the power conditioner is determined to be less than the outputtable power.

18. The control method according to claim 10, wherein when the control unit determines that the power is less than the outputtable power of the power conditioner, the control unit controls the converter such that power is discharged from the storage battery.

* * * * *